(12) United States Patent
Burugula et al.

(10) Patent No.: US 7,103,752 B2
(45) Date of Patent: Sep. 5, 2006

(54) METHOD AND APPARATUS FOR BROADCASTING MESSAGES WITH SET PRIORITY TO GUARANTEE KNOWLEDGE OF A STATE WITHIN A DATA PROCESSING SYSTEM

(75) Inventors: Ramanjaneya Sarma Burugula, Croton on Hudson, NY (US); Matthew David Fleming, Austin, TX (US); Joefon Jann, Ossining, NY (US); Mark Douglass Rogers, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 576 days.

(21) Appl. No.: 10/261,865

(22) Filed: Sep. 30, 2002

(65) Prior Publication Data

US 2004/0064676 A1 Apr. 1, 2004

(51) Int. Cl.
*G06F 15/163* (2006.01)
(52) U.S. Cl. .......................... 712/30; 711/141; 712/28; 712/29
(58) Field of Classification Search ................ 711/147, 711/148, 141; 712/28–30; 719/319
See application file for complete search history.

(56) References Cited

U.S. PATENT DOCUMENTS

| | | | | |
|---|---|---|---|---|
| 4,779,188 A | * | 10/1988 | Gum et al. ...................... 718/1 |
| 5,237,694 A | * | 8/1993 | Horne et al. ................. 710/200 |
| 5,603,005 A | * | 2/1997 | Bauman et al. .............. 711/124 |
| 5,790,398 A | * | 8/1998 | Horie ............................. 700/4 |
| 6,044,438 A | * | 3/2000 | Olnowich .................... 711/130 |
| 6,748,453 B1 | * | 6/2004 | Law et al. ................... 719/314 |
| 6,751,721 B1 | * | 6/2004 | Webb et al. .................. 712/10 |
| 2002/0078322 A1 | * | 6/2002 | Gunzinger ..................... 712/29 |
| 2002/0099833 A1 | * | 7/2002 | Steely et al. ................ 709/228 |

OTHER PUBLICATIONS

Short, Kenneth L. Embedded Microprocessor Systems Design, An Introduction Using the Intel 80C188EB. Prentice Hall, 1998. p. 465.*
Fleming et al., Apparatus and Method for Removing Elements from a Linked List, Aug. 22, 2002.
Fleming et al., Method and Apparatus for Isolating Frames in a Data Processing System, Aug. 22, 2002.

* cited by examiner

*Primary Examiner*—Eddie Chan
*Assistant Examiner*—Ryan Fiegle
(74) *Attorney, Agent, or Firm*—Duke W. Yee; Thomas E. Tyson; Brian D. Owens

(57) ABSTRACT

A method, apparatus, and computer instructions for broadcasting information. A change in data used by a number of processors in the data processing system is identified. A message is sent to the number of processors in the data processing system in which the message is sent with a priority level equal to a set of routines that use the data in response to identifying the change. This message is responded to only when the recipient is at an interrupt priority less favored than the priority of the message. A flag is set for each of the number of processors to form a plurality of set flags for the message in which the plurality of set flags are located in memory locations used by the number of processors in which the plurality of set flags remains set until a response is made to the message.

21 Claims, 3 Drawing Sheets

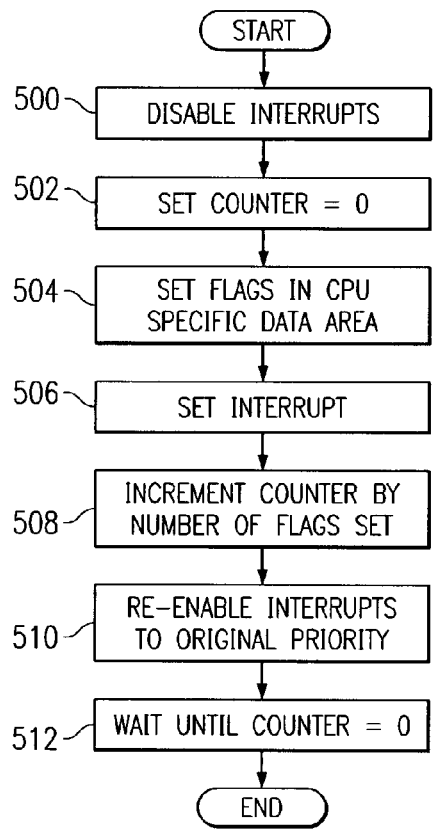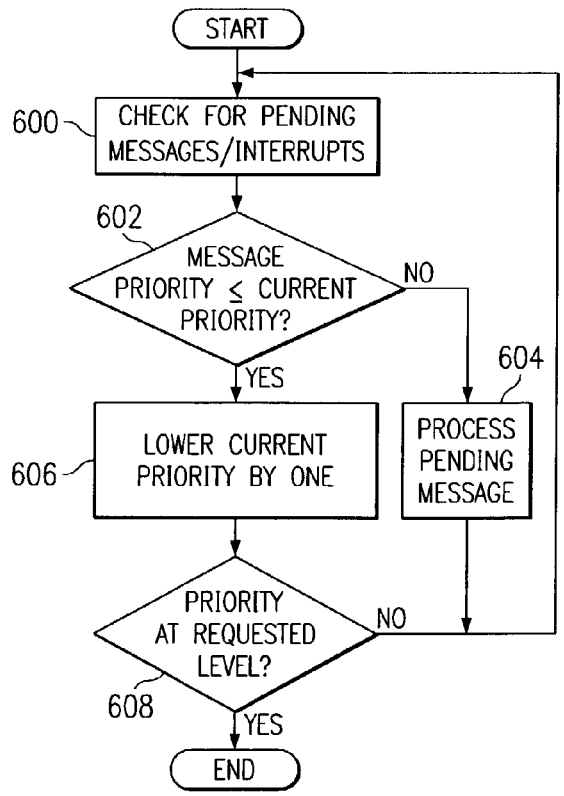

METHOD AND APPARATUS FOR BROADCASTING MESSAGES WITH SET PRIORITY TO GUARANTEE KNOWLEDGE OF A STATE WITHIN A DATA PROCESSING SYSTEM

CROSS REFERENCE TO RELATED APPLICATIONS

The present invention is related to the following applications entitled: "Apparatus and Methods for Removing Elements from a Linked List", Ser. No. 10/227,517, filed Aug. 22, 2002; and "Method and Apparatus for Isolating Frames in a Data Processing System", Ser. No. 10/227,518, filed Aug. 22, 2002; assigned to the same assignee and incorporated herein by reference.

BACKGROUND OF THE INVENTION

1. Technical Field

The present invention relates generally to an improved data processing system, and in particular, to a method and apparatus for managing data. Still more particularly, the present invention provides a method and apparatus for ensuring that processors accessing data obtain updated values.

2. Description of Related Art

With increasing processing demands, many data processing systems now contain multiple processors. With multiple processors, processing tasks may be split up between these processors. Further, these processors may access information that is accessed by other processors within the data processing system.

It is important for each processor in a multi-data processing system to be able to access updated values. At times, it is desirable to know when each processor has access to selected data. Instructions, such as sync instructions, imply that other processors will obtain updated values for information in memory. A sync instruction is an instruction that forces a flush of all changes to memory that are in a cache local to a CPU into main memory, and invalidates any cache lines that other CPUs may have that are for the same memory. So after a sync, the next time any CPU accesses a changed memory location, it will load the updated value from memory, rather than a stale value from its cache. These instructions, however, do not mean that the processors will not retain a local copy of an old value in a register. Such a situation may result in inaccuracies in calculations.

Therefore, it would be advantageous to have an improved method, apparatus, and computer instructions for ensuring that processors have up-to-date information in their registers.

SUMMARY OF THE INVENTION

The present invention provides a method, apparatus, and computer instructions for broadcasting information. A change in data used by a number of processors in the data processing system is identified. A message is sent to the number of processors in the data processing system in which the message is sent with a priority level equal to a set of routines that use the data in response to identifying the change. This message is responded to only when the recipient is at an interrupt priority level less favored than the priority level of the message. A flag is set for each of the number of processors to form a plurality of set flags for the message in which the plurality of set flags are located in memory locations used by the number of processors in which the plurality of set flags remains set until a response is made to the message.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a flowchart of a process used for sending a message broadcast in accordance with a preferred embodiment of the present invention; and FIG. 6 is a flowchart of a process used for lowering priority levels and receiving messages in accordance with a preferred embodiment of the present invention.

DETAILED DESCRIPTION OF THE PREFERRED EMBODIMENT

Figure 1:
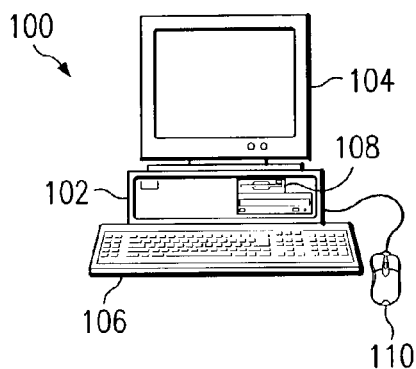
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
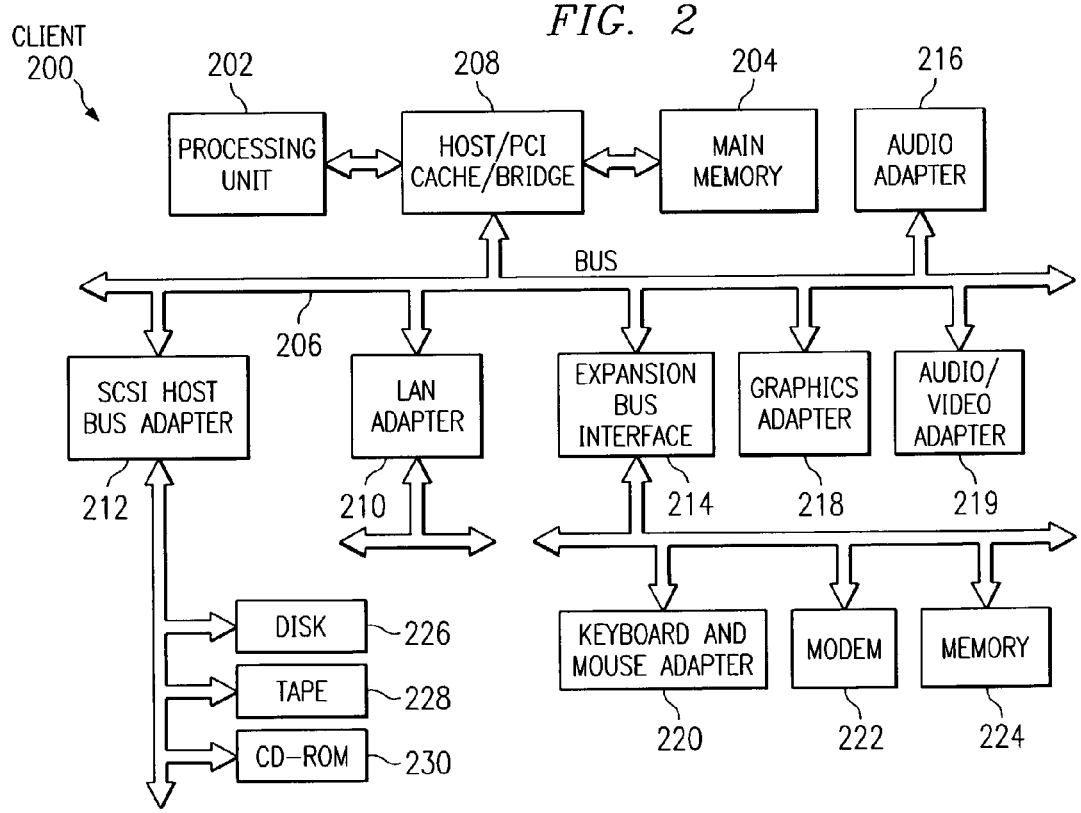
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processing unit 202 and main memory 204 are connected to PCI local bus 206 through PCI bridge 208. In these examples, processing unit 202 contains multiple central processing units. The mechanism of the present invention is implemented to ensure that these different processors within data processing system 200 have up-to-date information in their registers.

PCI bridge 208 also may include an integrated memory controller and cache memory for processing unit 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processing unit 202 and is used to coordinate and provide control of various components within data processing system 200 in FIG. 2. The operating system may be a commercially available operating system such as Windows XP, which is available from Microsoft Corporation. Instructions for the operating system and applications or programs are located on storage devices, such as hard disk drive 226, and may be loaded into main memory 204 for execution by processing unit 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM drive 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/ or user-generated data.

The depicted example in FIG. 2 and above-described examples are not meant to imply architectural limitations. The processes of the present invention are performed by processing unit 202 using computer implemented instructions, which may be located in a memory such as, for example, main memory 204, memory 224, or in one or more peripheral devices 226–230. When processing unit 202 contains a number of processors, data processing system 200 may be configured with logical partitions in which different operating systems may execute concurrently.

The present invention provides an improved method, apparatus, and computer instructions for ensuring that up-to-date information is contained in the registers for processors in a data processing system, such as data processing system 200 in FIG. 2. The mechanism of the present invention provides an advantage over the use of sync instructions in which processors may not contain a local copy of an old value in a register within the processor. This advantage is provided through the use of a message broadcast. For example, when a processor changes a memory location that will be used by routines of interest, the processor issues a message broadcast at the same interrupt priority as the routines that may read this memory location. When all of the other processors in the data processing system have responded to the message, the next time the routines of interest are executed, the new updated value will be seen.

Figure 3:
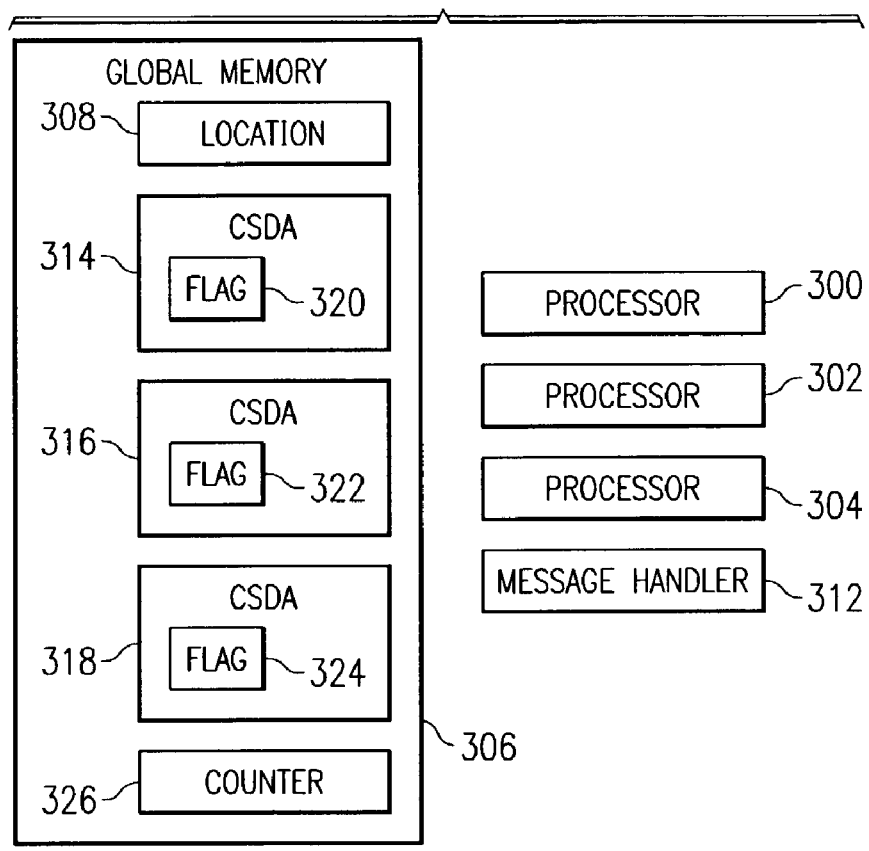
FIG. 3 is a diagram illustrating components used in updating values in accordance with a preferred embodiment of the present invention.

Turning now to FIG. 3, a diagram illustrating components used in updating values is depicted in accordance with a preferred embodiment of the present invention. The components illustrated in these examples are located in a data processing system, such as data processing system 200 in FIG. 2. The different software components are part of the kernel code in these examples.

Processors 300, 302, and 304 access data located in global memory 306. These processors may execute routines, which access memory location 308. The values in this memory location may be stored within registers within processors 300, 302, and 304. For example, processor 300 changes a value in memory location 308 to a new value to change a value being used by routines being executed by processors 300, 302, and 304. In this situation, processor 300 may issue a sync instruction, which will affect the value read by processors 302 and 304 when they read memory location 308, which execute routines also accessing these memory locations. The use of a sync instruction may imply that processors 302 and 304 will obtain updated values for information in global memory 306, but does not mean that the processors do not continue to have a local copy of an old value in a register.

The mechanism of the present invention includes having processor 300 issue a message broadcast. This message broadcast is issued by calling the message broadcasting routine, depicted in FIG. 5. The message broadcast is responded to by each receiving processor calling message handler 312. The message broadcast is sent at the same interrupt priority as the other routines that may be executed by processors 302 and 304, which access memory location 308. In addition, flags may be set in a message pending field of data areas accessed by processors 300, 302, and 304. Each message has a unique id and a bit in a message pending field of the CPU specific data area. A flag is set for the particular message of the present invention in these examples. Specifically, CPU specific data areas (CSDAs) 314, 316, and 318 are data areas that are assigned to processors 300, 302, and 304. Flags 320, 322, and 324 may be set within CPU specific data areas 314, 316, and 318, respectively. These flags indicate that a message is waiting for processors 300, 302, and 304.

In this example, flags 322 and 324 are set. Counter 326 is incremented each time a flag is set. In this example, counter 326 has a value of two after the setting of flags 322 and 324. Flag 320 is not set because processor 300 is the processor executing the message broadcast. Additionally, an interrupt is set within processors 302 and 304 to cause processors 302 and 304 to check CPU specific data areas 316 and 318 for flags. In these examples, this interrupt is set with the maximum possible interrupt priority. However, the message handler will only be called by these processors when they re-enable interrupts to a priority less favored than the priority associated with the message. Consequently, message handler 312 is run when the routines being executed by processors 302 and 304 have completed execution. Message handler 312 decrements the counter 326 and may perform other tasks. With respect to the mechanism of the present invention, message handler 312 does not need to do any other function except decrementing the counter. The other processors will only see the updated value in memory location 308 when these processors next execute the routines of interest. But because these processors have responded to the message, the issuing processor, processor 300, has knowledge that the other processors, processors 302 and 304, will see the new values the next time these processors use the values located in memory location 308.

As message handler 312 is executed, each processor checking the message will clear the flag set for the processor. Message handler 312 decrements the count in counter 326 as each flag is cleared. When counter 326 reaches zero, this state indicates that all of the processors have responded to the message. As a result, the next time the routines of interest are executed, the new updated values will be used by the routines.

Figure 4:
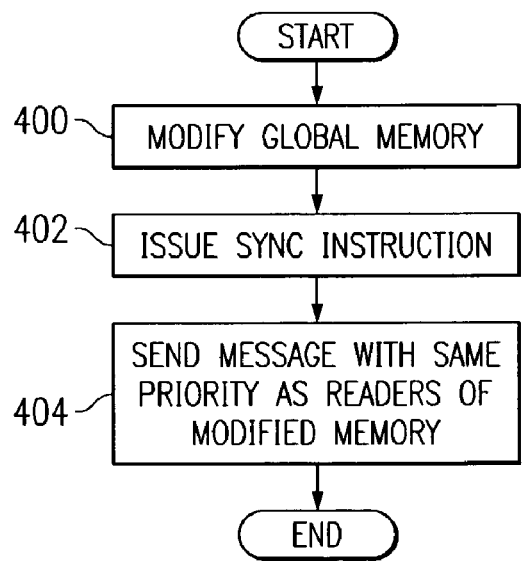
FIG. 4 is a flowchart of a process for using a message broadcast in accordance with a preferred embodiment of the present invention.

Turning now to FIG. 4, a flowchart of a process for using a message broadcast is depicted in accordance with a preferred embodiment of the present invention. The process illustrated in FIG. 4 may be implemented in a processor, such as processor 302 in FIG. 3.

The process begins by modifying the global memory (step 400). In this example, the modification of the global memory is a change in the value of memory locations accessed by the routines executed by the different processors. Next, a sync instruction is issued (step 402). A sync instruction is a machine language instruction that enforces some ordering properties on instruction execution and the values that are loaded from cache/memory. The message is sent with the same priority as the readers of modified memory (step 404) and the process terminates thereafter. In these examples, the processors receiving the message do not actually perform any action other than calling the message handler, in a preferred embodiment of the present invention. Because the processors called the message handler, a period of time existed during which the processors were not executing the routines of interest. Therefore, these processors did not have any registers with stale values. The next time each processor executes the routines of interest, that processor will see the new, updated value.

With reference now to FIG. 5, a flowchart of a process used for sending a message broadcast is depicted in accordance with a preferred embodiment of the present invention. The process illustrated in FIG. 5 may be implemented in a routine executed by a processor, such as processor 300 in FIG. 3. This routine is typically executed in response to an update to a value being used by routines. This update typically occurs by one processor changing a value in a memory location.

The process begins by disabling interrupts (step 500). With respect to disabling interrupts, it is desirable that the flags for each processor be set and the counter incremented before anything else can happen on this processor. By disabling all interrupts, it is known that no instructions will execute on this processor other than the ones for sending the message, until interrupts are re-enabled.

The counter is set to zero (step 502). The counter in step 502 is a counter, such as counter 326 in FIG. 3. This counter is used to indicate whether all of the processors have responded to the message being broadcast. Flags are set in the CPU specific data areas (step 504). The CPU specific data areas in which flags are set are areas associated with processors that may be executing routines that are affected by an update in the state of values being used by those routines. Additionally, an interrupt is set in the interrupt register of these processors at the maximum interrupt priority level (step 506).

The counter is incremented by the number of flags set (step 508). The interrupts are re-enabled to their original priority (step 510). This step allows the processor sending the message to process normal operating system interrupts while the processor sending the message waits for each other processor to respond to the message. Since all the other processors have had their flag set and their interrupt register set, it no longer matters if this processor is temporarily interrupted to service standard operating system interrupts. The process waits until the counter is set to zero (step 512) and the process terminates thereafter. When the counter reaches zero, all of the processors have responded to the message. The next time the routines are executed, these routines will see the new updated value.

With reference now to FIG. 6, a flowchart of a process used for lowering interrupt priority levels and for receiving messages is depicted in accordance with a preferred embodiment of the present invention. The process illustrated in FIG. 6 may be implemented in a routine executed by a processor, such as processor 302 in FIG. 3.

Processing the message includes calling the message handler and decrementing the counter is a function performed by the message handler. When a processor re-enables interrupts, the processor decrements its interrupt level by one and then checks again for pending messages/interrupts above this level. So each of the other processors, when they re-enable interrupts after finishing the routines of interest, will at some point then discover that they are now at a low enough interrupt priority to be interrupted by the message broadcast, and will call the message handler.

The process begins by checking a global array for the priority of the message and checking for any pending interrupts (step 600). This message is a message broadcast, such as the one made in step 404 in FIG. 4. A determination is made as to whether the priority of the message is less than or equal to the current priority level (step 602). If the priority of the message is less than or equal to the current priority level, the process lowers its priority (step 606) and checks if the priority is at the requested level (step 608). It is not necessarily the case that the interrupts are re-enabled to a 'base level'—where the process can be interrupted by anything. Interrupts are re-enabled by calling a routine and passing the process a parameter which is the interrupt level desired. This level may be any interrupt level from base level on up. In these examples, the routines of interest are executing at an interrupt level that is one step above base level. Of course higher interrupt levels may be used in which the interrupts are not re-enabled to the base level, but still should see a message broadcast when re-enabling interrupts. If the priority level is not the requested level, the process returns to step 600. Otherwise, the process will end. Returning to step 602, if the message or interrupt pending is of priority greater than the current priority, then the pending message is processed at the priority level of the message/interrupt (step 604) with the process returning to step 600 to continue decrementing its priority until done.

Thus, the present invention provides an improved method, apparatus, and computer instructions for updating values used by processors in a multi-processor data processing system. The mechanism of the present invention provides an advantage over the use of sync instructions by ensuring that the processor modifying global memory has knowledge of when other processors will contain up-to-date information in their registers. This advantage is provided through the use of a message sent or broadcast to processors that may execute routines affected by the change in values or data.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of tangible computer readable media include recordable-type media, such as a floppy disk, a hard disk drive, a RAM, CD-ROMs, DVD-ROMs, semiconductor or solid state memory, magnetic tape, rigid magnetic disk, and an optical disk. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for broadcasting information, the method comprising:
    identifying a change in data used by a number of processors in the data processing system;
    responsive to identifying the change, sending a message to the number of processors in the data processing system, wherein the message is sent with a priority level equal to a priority level of a set of routines that use the data; and
    setting a flag for each of the number of processors to form a plurality of set flags for the message, wherein the plurality of set flags are located in memory locations used by the number of processors, wherein the plurality of set flags remains set until a response is made to the message, wherein the message that is broadcast is responded to by each receiving processor when a priority level for an interrupt of the recipient is less than the priority level of the message.

2. The method of claim 1, wherein the message is a message broadcast.

3. The method of claim 1 further comprising:
    setting an interrupt in the number of processors.

4. The method of claim 3, wherein the interrupt is set at the maximum interrupt priority but the message is responded to at a interrupt priority level associated with the message.

5. The method of claim 1 further comprising:
    incrementing a counter for each flag set; and
    monitoring the counter to determine when all of the number of processors have responded to the message.

6. The method of claim 1 further comprising:
    disabling interrupts for a processor issuing the message prior to setting the plurality of flags; and
    enabling the interrupts after setting the plurality of flags.

7. The method of claim 1, wherein the change in data is a change in value of a memory location accessed by the set of routines.

8. The method of claim 7, wherein the memory location contains a value and at a later time contains an updated value.

9. The method of claim 1, wherein the message is processed after the set of routines finish execution.

10. A data processing system for broadcasting information, the data processing system comprising:
    a bus system;
    a communications unit connected to the bus system;
    a memory connected to the bus system, wherein the memory includes a set of instructions; and
    a processing unit connected to the bus system, wherein the processing unit executes the set of instructions to identify a change in data used by a number of processors in the data processing system;
    send a message to the number of processors in the data processing system in which the message is sent with a priority level equal to a set of routines that use the data in response to identifying the change; and set a flag for each of the number of processors to form a plurality of set flags for the message in which the plurality of set flags are located in memory locations used by the number of processors in which the plurality of set flags remains set until a response is made to the message; and where the message cannot be responded to until the interrupt priority of the recipient is less than the priority of the message.

11. A data processing system for broadcasting information, the data processing system comprising:
    identifying means for identifying a change in data used by a number of processors in the data processing system;
    sending means, responsive to identifying the change, for sending a message to the number of processors in the data processing system, wherein the message is sent with a priority level equal to a priority level of a set of routines that use the data;
    setting means for setting a flag for each of the number of processors to form a plurality of set flags for the message, wherein the plurality of set flags are located in memory locations used by the number of processors, wherein the plurality of set flags remains set until a response is made to the message; and
    responding means for acknowledging the message, which is performed by each receiving processor when a priority level for the interrupt of the receiving processor is less than the priority level of the message.

12. The data processing system of claim 11, wherein the message is a message broadcast.

13. The data processing system of claim 11, wherein the setting means is a first setting means and further comprising:
    second setting means for setting an interrupt in the number of processors.

14. The data processing system of claim 13, wherein the interrupt is a maximum priority interrupt but the message is responded to at the priority level associated with the message.

15. The data processing system of claim 11 further comprising:
    incrementing means for incrementing a counter for each flag set; and
    monitoring means for monitoring the counter to determine when all of the number of processors have responded to the message.

16. The data processing system of claim 11 further comprising:
   disabling means for disabling interrupts an issuing processor issuing the message prior to setting the plurality of flags; and
   enabling means for enabling the interrupts after setting the plurality of flags.

17. The data processing system of claim 11, wherein the change in data is a change in value of a memory location accessed by the set of routines to a new value.

18. The data processing system of claim 17, wherein the memory location contains a value and at a later time the memory location contains an updated value.

19. The data processing system of claim 11, wherein the message is processed after the set of routines that access the modified value finish execution.

20. A computer program product in a recordable computer readable medium for broadcasting information, the computer program product comprising:
   first instructions for identifying a change in data used by a number of processors in the data processing system;
   second instructions, responsive to identifying the change, for sending a message to the number of processors in the data processing system, wherein the message is sent with a priority level equal to a priority level of a set of routines that use the data;
   third instructions for setting a flag for each of the number of processors to form a plurality of set flags for the message, wherein the plurality of set flags are located in memory locations used by the number of processors, wherein the plurality of set flags remains set until a response is made to the message; and
   fourth where the message that is sent is responded to by each of the receiving processors when a priority level of interrupts of the recipient is less than the priority level of the message.

21. The method of claim 1, further comprising:
   responsive to sending a message to the number of processors in the data processing system, updating register values to include the change in data for each of the number of processors and sending the response for verifying that a next set of routines that use the data have updated values.

* * * * *